United States Patent
Banks et al.

(10) Patent No.: US 6,247,038 B1
(45) Date of Patent: *Jun. 12, 2001

(54) OPTIMIZED SYNCHRONIZATION PROCEDURE

(75) Inventors: Timothy William Banks; Ian Hunter; Glyn Normington, all of Winchester; Dennis Jack Zimmer; Peter James Lupton, both of Chandlers Ford, all of (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,830

(22) Filed: Jul. 12, 1996

(30) Foreign Application Priority Data

Jul. 19, 1995 (GB) .................................. 9514819

(51) Int. Cl.⁷ ...................................... G06F 9/00
(52) U.S. Cl. ............................................. 709/100
(58) Field of Search ................... 395/670, 671, 395/600; 709/101, 400; 707/202

(56) References Cited

U.S. PATENT DOCUMENTS

| | | |
|---|---|---|
| 5,165,031 * | 11/1992 | Pruul et al. . |
| 5,261,089 * | 11/1993 | Coleman et al. ............ 395/600 |
| 5,371,886 * | 12/1994 | Britton et al. ............... 395/600 |
| 5,428,771 * | 6/1995 | Daniels et al. . |
| 5,481,699 * | 1/1996 | Saether . |
| 5,546,582 * | 8/1996 | Brockmeyer et al. . |
| 5,613,060 * | 3/1997 | Britton et al. . |
| 5,701,480 * | 12/1997 | Raz ........................... 395/671 |
| 5,958,019 * | 9/1999 | Hagersten .................. 709/400 |

OTHER PUBLICATIONS

IBM, SNA Sync Point Services Architecture Reference, 1994.*
IBM Technical disclosure bulletin,, "Recovery management in transaction processing systems" vol. 39, No. 4, pp. 27–30, Apr. 1996.*
IBM Technical disclosure bulletin, "Resolution of In–doubt recoverable units of work", vol. 25, No. 7B, pp. 3744–3748, Dec. 1982.*
IBM Technical disclosure bulletin, "Combining presumed abort two phase commit protocols with SNA's kast agent optimization", vol. 34, No. 7B, pp. 334–338, Dec. 1991.*

* cited by examiner

Primary Examiner—Majid A. Banankhah
Assistant Examiner—P. G. Caldwell
(74) Attorney, Agent, or Firm—Jeanine S. Ray-yarlette

(57) ABSTRACT

Disclosed is a method for providing synchronization of a transaction in a data processing system where the transaction involves a plurality of agents participating in the transaction and one coordinator for coordinating the transaction. The agents include at least a middleman which coordinates a set of at least one of the agents. A vote is sent indicating the availability or non-availability to commit from each of the agents to the coordinator. The coordinator determines a commit or backout decision when all the votes are received. A Not Known decision message is sent from the middleman to each of the agents in the set available to commit if the decision is not available at the middleman because of a failure. The Not Known decision message stops resynchronization of each of the available agents. If the middleman has responsibility for resynchronization then, on availability of the decision at the middleman, a resynchronization message is sent to each of the available agents. If the middleman does not have responsibility for resynchronization, then a Known decision message is sent to each of the available agents from the middleman. Receipt of the Known decision message starts resynchronization of each of the available agents.

20 Claims, 7 Drawing Sheets a)

b)

OPTIMIZED SYNCHRONIZATION PROCEDURE

FIELD OF THE INVENTION

The present invention relates to synchronization of transactions in data processing systems. More particularly it relates to the synchronization of a transaction in a data processing system including a plurality of agents participating in the transaction and one coordinator for coordinating said transaction, the agents including at least a middleman coordinating a set of at least one of the agents, including the steps of sending a vote indicating the availability or non-availability to commit from each of the agents to the coordinator, and determining a commit or backout decision by the coordinator when all the votes are received.

BACKGROUND OF THE INVENTION

In data processing systems, access and updates to system resources are typically carried out by the execution of discrete transactions (or units of work). A transaction is a sequence of coordinated operations on system resources such that either all of the changes take effect or none of them does. These operations are typically changes made to data held in storage in the transaction processing system; system resources include databases, data tables, files, data records and so on. This characteristic of a transaction being accomplished as a whole or not at all is also known as atomicity.

In this way, resources are prevented from being made inconsistent from each other. If one of the set of update operations fails then the others must also not take effect. A unit of work then transforms a consistent state of resources into another consistent state, without necessarily preserving consistency at all intermediate points.

The atomic nature of transactions is maintained by means of a transaction synchronization procedure commonly called the commit procedure. Logical points of consistency at which resource changes are synchronized within transaction execution are called commit points or syncpoints. An application ends a unit of work by declaring a syncpoint, or by the application terminating.

Atomicity of a transaction is achieved by resource updates made within the transaction being held in-doubt (uncommitted) until a syncpoint is declared at completion of the transaction. If the transaction succeeds, the results of the transaction are made permanent (committed); if the transaction fails, all effects of the unsuccessful transaction are removed (backed out). That is, the resource updates are made permanent and visible to applications other than the one which performed the updates only on successful completion. For the duration of each unit of work, all updated resources must then be locked to prevent further update access. On the contrary, when a transaction backs out (or rolls back), the resources are restored to the consistent state which existed before the transaction began.

There are a number of different transaction processing systems commercially available; an example of an on-line transaction processing system is the CICS system developed by International Business Machines Corporation (IBM is a registered trademark and CICS is a trademark of International Business Machines Corporation).

In a transaction data processing system which includes either a single node where transaction operations are executed or which permits such operations to be executed at only one node during any transaction, atomicity is enforced by a single-phase synchronization operation. In this regard, when the transaction is completed, the node, in a single phase, either commits to make the changes permanent or backs out.

In distributed systems encompassing a multiplicity of nodes, a transaction may cause changes to be made to more than one of such nodes. In such a system, atomicity can be guaranteed only if all of the nodes involved in the transaction agree on its outcome. A simple example is a financial application to carry out a funds transfer from one account to another account in a different bank, thus involving two basic operations to critical resources: the debit of one account and the credit of the other. It is important to ensure that either both or neither of these operations take effect.

Distributed systems typically use a transaction synchronization procedure called two-phase commit (2PC) protocol to guarantee atomicity. In this regard, assume that a transaction ends successfully at an execution node and that all node resource managers (or agents) are requested to commit operations involved in the transaction. In the first phase of the protocol (prepare phase), all involved agents are requested to prepare to commit. In response, the agents individually decide, based upon local conditions, whether to commit or back out their operations. The decisions are communicated to a synchronization location, called the coordinator, where the votes are counted. In the second phase (commit phase), if all agents vote to commit, a request to commit is issued, in response to which all of the agents commit their operations. On the other hand, if any agent votes to back out its operation, all agents are instructed to back out their operations. In a large system with a high volume of transactions, the two phase commit process may arrange the agents in a tree like manner in which one of a subset of agents acts as a middleman to coordinate the votes of the subset and send a combined vote to the main coordinator.

Distributed systems are organized in order to be largely recoverable from system failures, either communication failures or node failures. A communication failure and a failure in a remote node generally manifest themselves by the cessation of messages to one or more nodes. Each node affected by the failure can detect it by various mechanisms, including a timer in the node which detects when a unit of work has been active for longer than a preset maximum time. A node failure is typically due to a software failure requiring restarting of the node or a deadlock involving pre-emption of the transaction running on the node.

System failures are managed by a recovery procedure requiring resynchronization of the nodes involved in the unit of work. Since a node failure normally results in the loss of information in volatile storage, any node that becomes involved in a unit of work must write state changes (checkpoints) to non-volatile storage synchronously with the transmission of messages during the two-phase commit protocol. These checkpoint data (or log messages) are written to a stable storage medium as the protocol proceeds to allow the same protocol to be restarted from a consistent state in the case of a failure of the node. This is known as resynchronization.

U.S. Pat. No. 5,311,773 describes how a commit procedure can be resynchronized asynchronously after a failure while allowing an initiating application to proceed with other tasks. It does not, however, address the problem of interruption of communication to multiple partner nodes involved in a distributed unit of work.

The IBM System Network Architecture or IBM SNA LU 6.2 syncpoint architecture developed by International Business Machines Corporation is known to coordinate commits between two or more protected resources. The LU 6.2 architecture supports a syncpoint manager (SPM) which is responsible for resource coordination, syncpoint logging and recovery. A description of the communication protocol used in this architecture is found in the book "SNA Peer Protocols for LU6.2" (ref. SC31-6868-1, IBM Corporation).

A problem with known protocols for two-phase commit across networks is that they do not cater adequately for the case where contact with the coordinator of the unit of work is lost. In such cases, it is not possible to immediately tell other partners of the distributed unit of work what the outcome is. The decision is only known later when contact is made with the coordinator.

If contact is lost, partners can be kept waiting forever until contact is made again. Each of the partners may hold resource locks and keep application code and end users waiting for a long time. Operator action is then required to release locks, applications and end user screens.

A known solution to this problem is to break the communication with the partners and to enter a timed retry loop between all partners. There are some drawbacks with this prior art approach. Retry loops are very inefficient, particularly in the case where there are either many agents issuing them or they are done frequently. In addition, operational problems can arise due to the breakages of communications.

A delay in the resolution of the unit of work outcome is produced, dependent on the timing of the retry loop, causing a considerable reduction in concurrency of resource update processing (particularly if many resources are involved). At the restart of a node, there may be many resynchronization tasks which can overload the system; if many communicating nodes are restarted simultaneously, deadlock can occur.

SUMMARY OF THE INVENTION

The above drawbacks of the prior art are overcome in systems employing a middleman by the provision of a method for synchronization of a transaction in a data processing system as set out above which is characterised by the steps of sending a Not Known decision message from a middleman to each of the agents in a set available to commit if the decision is not available at the middleman because of a failure, the Not Known decision message stopping resynchronization of each of said available agents, on availability of the decision at the middleman, sending a resynchronization message to each of the available agents from said middleman, if it has responsibility for resynchronization, or sending a Known decision message to each of the available agents from the middleman if it does not have responsibility for resynchronization, said Known decision message starting resynchronization of each of the available agents.

Thus the partner is specifically told what the problem is, so it can take appropriate action. In addition, the session is not released, thus improving performance and reducing operator interaction.

The method is implemented by means of a computer program executable in and part of a data processing system.

It should be noted that the proposed solution does not require changes to any existing protocols and it can be then easily incorporated into an existing system, allowing a relatively simple implementation. The solution may be employed in the Presumed Abort, Presumed Nothing and Last Agent Optimisation protocols defined by SNA for LU type 6.2 in the above referenced book "SNA Peer Protocols for LU6.2".

A further advantage of the present invention is that it simplifies in practical terms the management of distributed systems that support high transaction rates.

BRIEF DESCRIPTION OF THE DRAWINGS

Embodiments of the invention will now be described in detail, by way of example only, with reference to accompanying figures, where.

DETAILED DESCRIPTION

Figure 1:
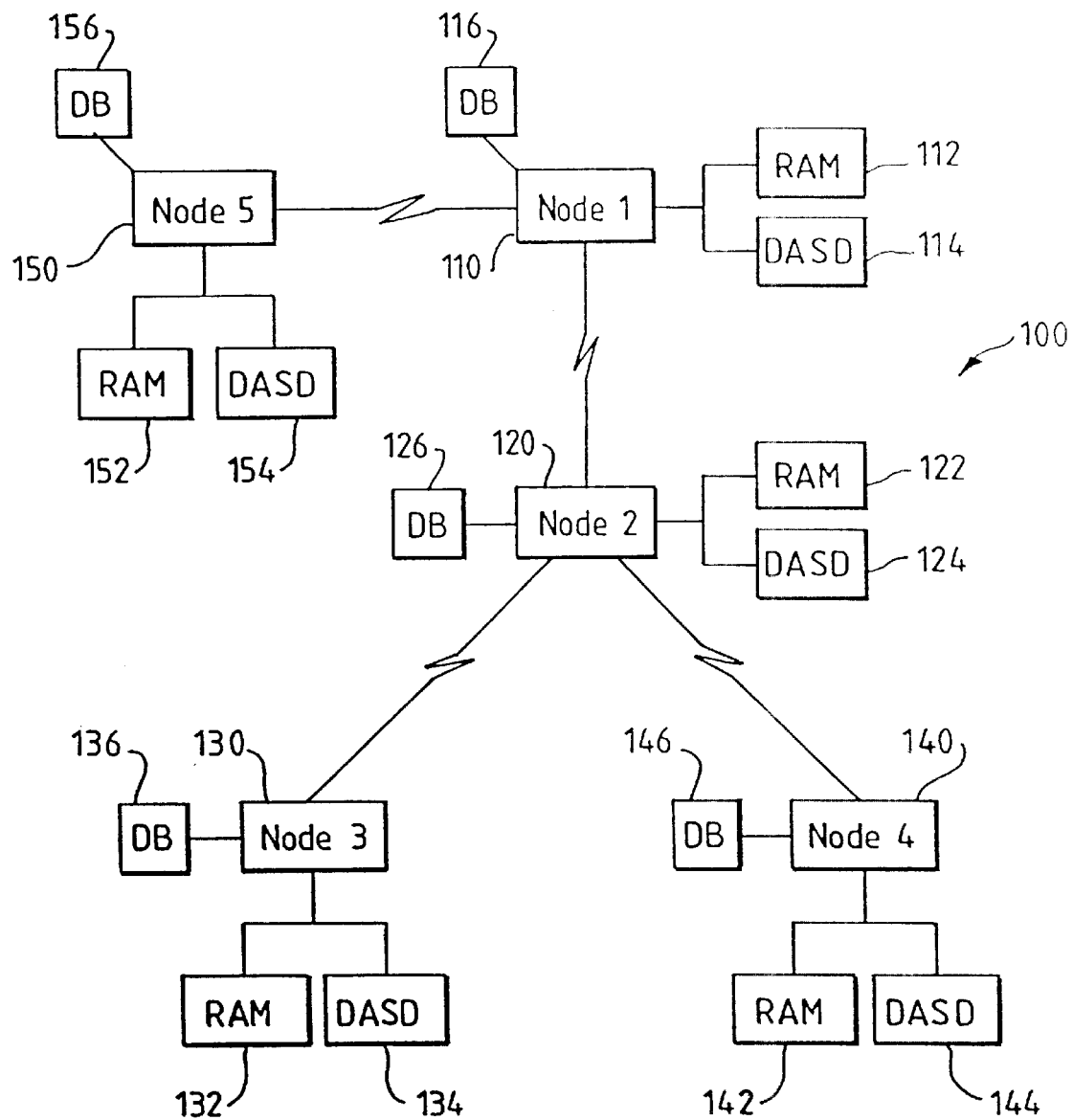
FIG. 1 is a schematic view of a data processing system in which the present invention may be implemented.

With reference now to the figures and in particular with reference to FIG. 1, a schematic view of a data processing system which may be utilized to implement the present invention is depicted. The general architecture 100 shows a distributed data processing system comprizing five nodes. At an application node 110 there is, for example, a mainframe computer such as an IBM Enterprise System/9000 or ES/9000 (Enterprise System/9000 and ES/9000 are trademarks of International Business Machines Corporation) executing a transaction-based application program, such as CICS from IBM Corp. Node 110 includes a volatile memory (or RAM) 112 and a non-volatile memory 114, typically a Direct Access Storage Device (or DASD), used for storing information about the 2 PC protocol. Information stored in the non-volatile memory 114 is permanent, that is it is not lost in the event of a node failure, but can be accessed after the node has been restarted. Information stored in volatile memory 112 is, on the contrary, lost in the event of a node failure. Application node 110 accesses a plurality of local resources, for example a database 116 by way of a database management system and a plurality of files on a direct access storage device 114. The application node 110 is enabled to communicate with similarly-constructed nodes 120, 130, 140 and 150 by way of a data communications facility. The transaction-based application program executing at the application node 110 is enabled to access resources at the other nodes, through a standard system interface such as the systems network architecture (SNA) by peer-to-peer protocols implemented in, for example, the LU 6.2 architecture extension. Node 120 acts as a middleman, allowing application node 110 to access resources on nodes 130 and 140.

Figure 2:
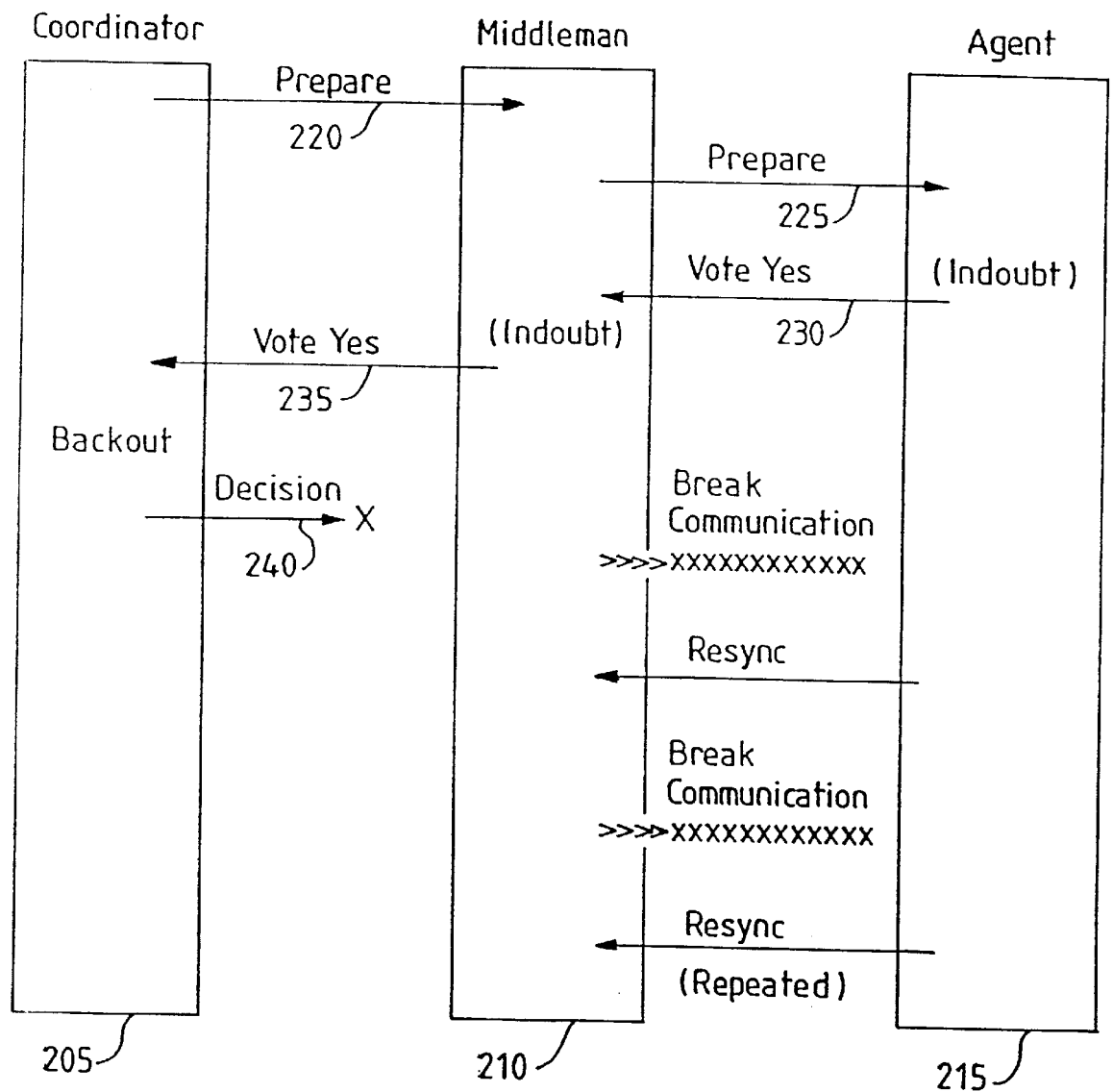
FIG. 2 shows a particular case of a two-phase commit protocol known in the art.

With reference now to FIG. 2, a particular case of a two-phase commit protocol known in the art is shown. The two phases of the protocol are the voting phase, when systems prepare to take action either to back out or to commit their work, and the commit phase when a decision is broadcast; the final decision is taken by one of the nodes, known as the coordinator.

FIG. 2 shows an agent 215 communicating with a coordinator 205 through a middleman 210. A unit of work is managed by establishing two conversations between nodes 205–210 and nodes 210–215. Each conversation between a first and a second node necessitates the establishment of a communication session between the two nodes. Since, if a session fails during the syncpoint protocol, each node may try to contact the other to retransmit or ask for re-transmission of a message, two sessions are simultaneously available between each node. Changes to resources as part of the unit of work are then performed by the user process; user data are exchanged between the nodes involved in the unit of work through user data messages. During the unit of work and the related two-phase commit synchronization each node stores in its volatile memory information concerning state changes. At checkpoints, this state change information is in addition forced to non-volatile memory to allow a node to recover from a failure.

The nodes exchange data messages until they decide, according to an agreed plan, that a syncpoint is due, and one of them signals to the syncpoint manager that the protocol should be started. The coordinator 205 starts the two-phase commit synchronization by sending a prepare message 220 to the middleman 210.

The middleman node 210 acts as an agent in the conversation with node 205 and as an coordinator in the conversation with node 215. The middleman 210 thus sends a prepare message 225 to the agent 215.

Based upon local conditions, the agent 215 decides to commit or to backout its operations. In the depicted example, the agent 215 has decided to commit and sends a vote Yes message 230 to the middleman 210. While the agent 215 waits to hear from its partner about the outcome of the unit of work, it is in an "In-doubt" state. The middleman 210 (acting as a coordinator to node 215) decides to commit and sends a vote Yes message 235 to the coordinator 205 and itself becomes In-doubt.

If communications are broken at any stage, the protocol enters a resynchronization phase. The responsibility to re-establish contact during resynchronization rests with one (or occasionally both) of the communicating partners, as defined in the protocol. In the example shown in FIG. 2, communication with the coordinator is lost before the decision 240 is received at the middleman 210. The middleman 210 then continues to break communication with the agent 215 until its own communication to the coordinator 205 is reestablished, when it replies to the resynchronization from the agent 215.

Figure 3:
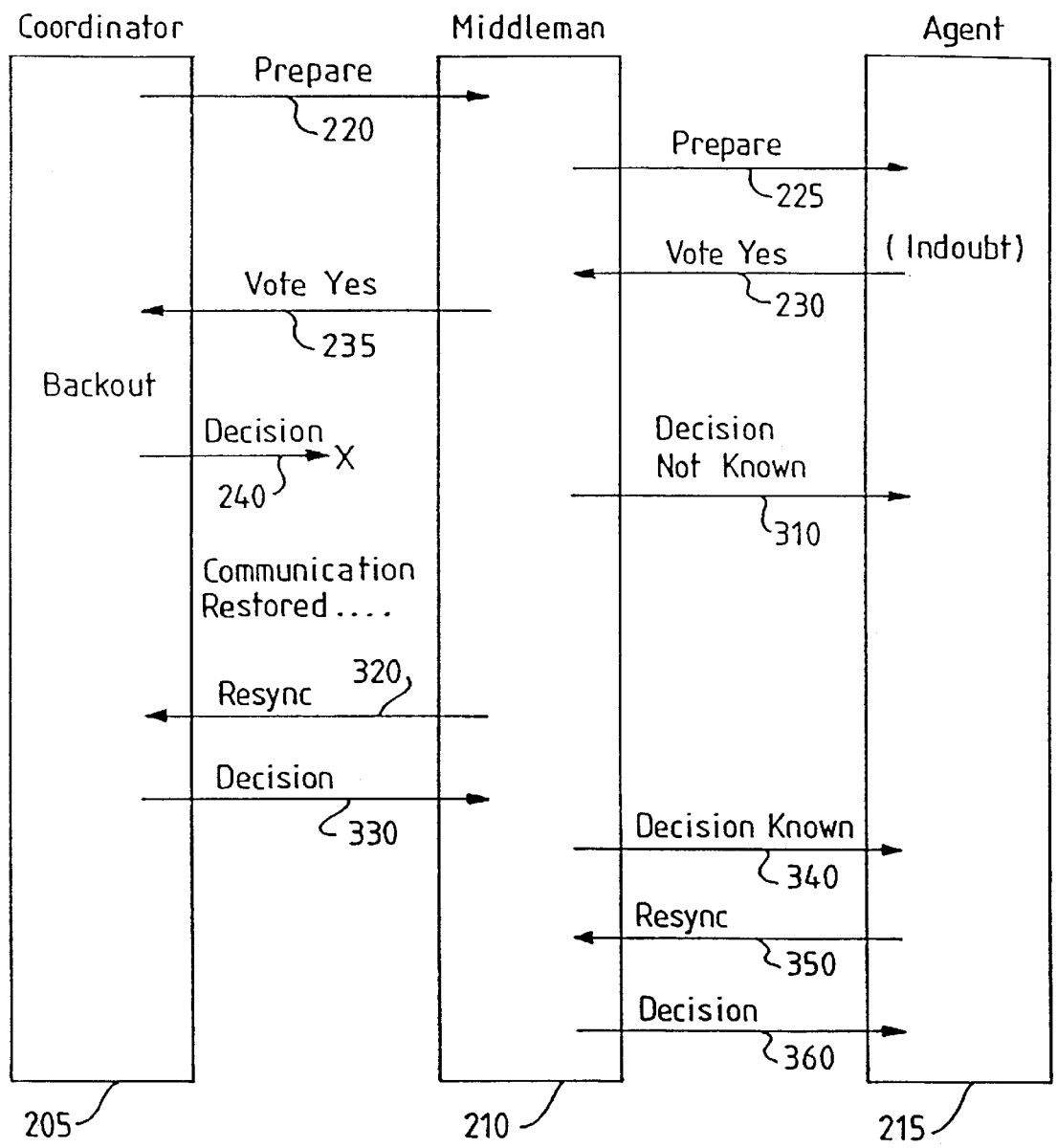
FIG. 3 is an overview diagram of message flows in a particular embodiment of the present invention.

Referring now to FIG. 3, an overview diagram of message flow communication in a particular embodiment of the present invention is depicted. FIG. 3 features a system with a coordinator 205, a middleman 210 and an agent 215. Flows are defined to communicate that the contact with the coordinator has been lost, or that it has been reestablished. In the depicted example, two conversations between nodes 205–210 and nodes 210–215 have been established and changes to resources as part of the unit of work are then performed by the user process through user data messages exchanged between the nodes. State changes are stored in each node in its volatile memory and checkpoints are in addition forced to non-volatile memory to allow a node to recover from a failure.

The coordinator 205 starts the two-phase commit synchronization by sending a prepare message 220 to the middleman 210 that in turn, acting as an agent to the conversation with node 205 and as an coordinator to the conversation with node 215, sends a prepare message 225 to the agent 215.

If the agent 215 decides to commit the unit of work, it sends a vote Yes message 230 to the middleman 210 and becomes In-doubt. The middleman 210 in turn (acting as a coordinator to node 215) decides to commit and sends a vote Yes message 235 to the coordinator 220 and becomes In-doubt.

During the two-phase commit synchronization, after a vote Yes message 235 is sent to the coordinator 205 but before the decision 330 is received at the middleman 210, communication is lost. Instead of breaking communication with the agent 215, the middleman 210 sends a "Decision Not Known" message 310 to the agent 215, communicating the fact that no decision is available; the middleman 210 then waits until communication with the coordinator 205 is restored. This Not Known message causes the agent 215 to suppress resynchronization until it is notified. It must, in the meantime, continue to hold locks on any resources modified in the unit of work. The agent 215 is thus specifically told what the problem is and why it is waiting, so it can take appropriate actions; in addition, the session is not released, thus performance is improved and operator interaction is reduced.

When communications are restored between the coordinator 205 and the middleman 210, the middleman sends a resynchronization message 320 to the coordinator 205 and then receives a decision message 330 about the unit of work. Now that the decision is available at the middleman 210, it sends a "Decision Known" message 340 to the agent 215, communicating the availability of the decision (though not the decision itself). The agent 215 then starts a resynchronization sequence sending a resynchronization message 350 to the middleman 210 and receives a decision message 360 from the middleman 210. It should be noted that the proposed solution does not require changes to any existing protocols and it can be then easily incorporated into an existing system, allowing a relatively simple implementation.

In the communication protocols known in the art information is hardened to non-volatile storage media to record the progress of the protocol and the decision that is made. In the case of a system failure this information is used to restore the state of the system. According to an embodiment of the present invention, preferably no information is recorded on non-volatile media concerning the messages (Not Known decisions) associated with the solution. This is a desirable feature since the existing rules for hardening of information are complicated by such optimisations.

Figure 4A:
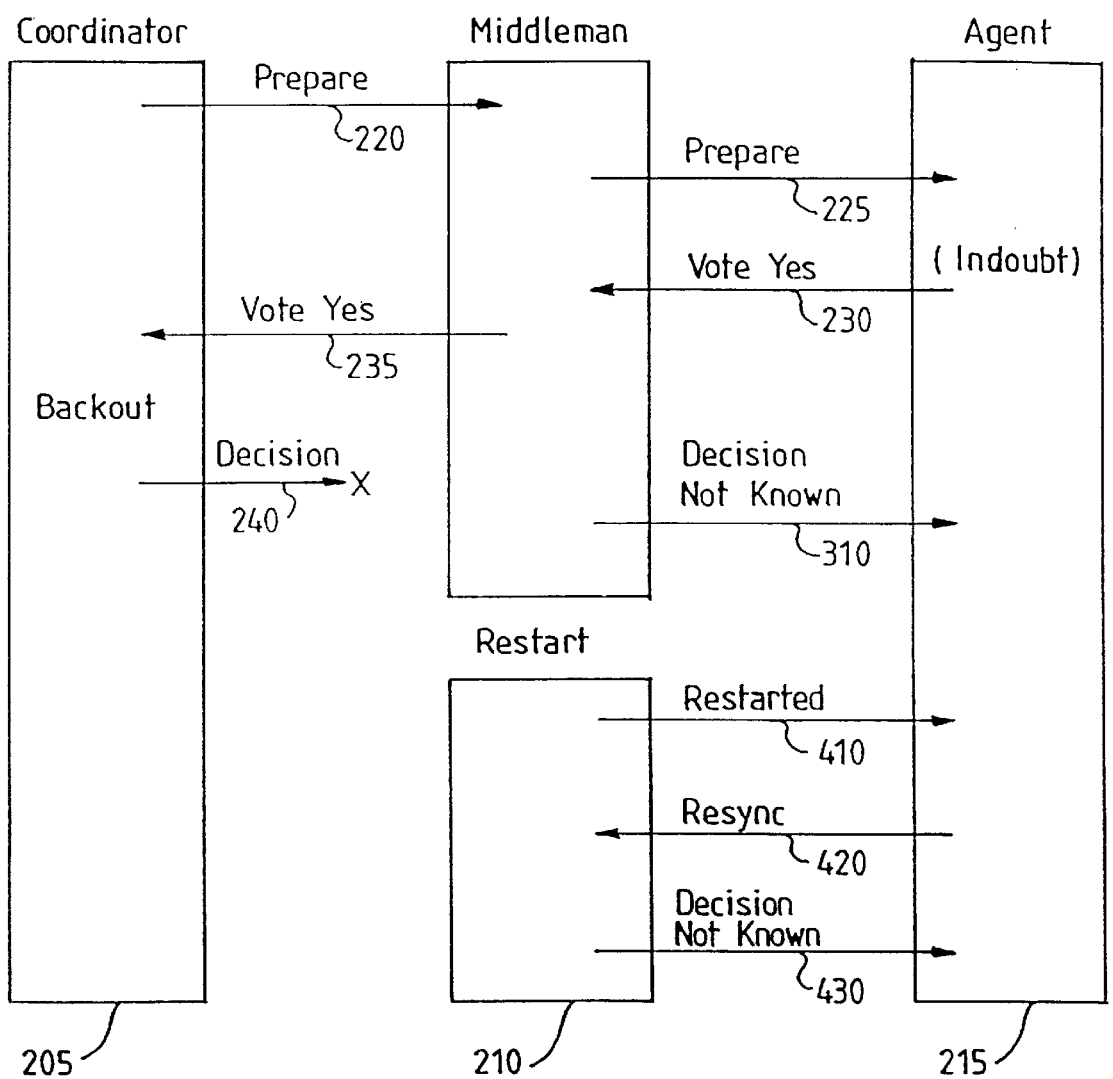
FIGS. 4a and 4b show different message communication flows following a restart of the system.

FIG. 4a shows a first message communication flow following a restart of the system, used to restore the state which existed before the restart. In the depicted example, the middleman 210 has failed after sending the Not Known decision message 310 to the agent 215. Since the middleman 210 does not force checkpoint information related to the not known decision messages to non-volatile storage, a failure of the middleman 210 results in a loss of this information. Following the restart of the middleman 210, a restarting message 410 is then sent to the agent 215. If the agent 215 had been suppressing resynchronization due to the preceding receipt of a Not Known decision message 310, it now attempts it, by sending a resynchronization message 420 to the middleman 210. If the decision is still unknown at the middleman 210 a new Not Known decision message 430 will be sent, and the relationship which existed before the failure is reestablished.

Figure 4B:
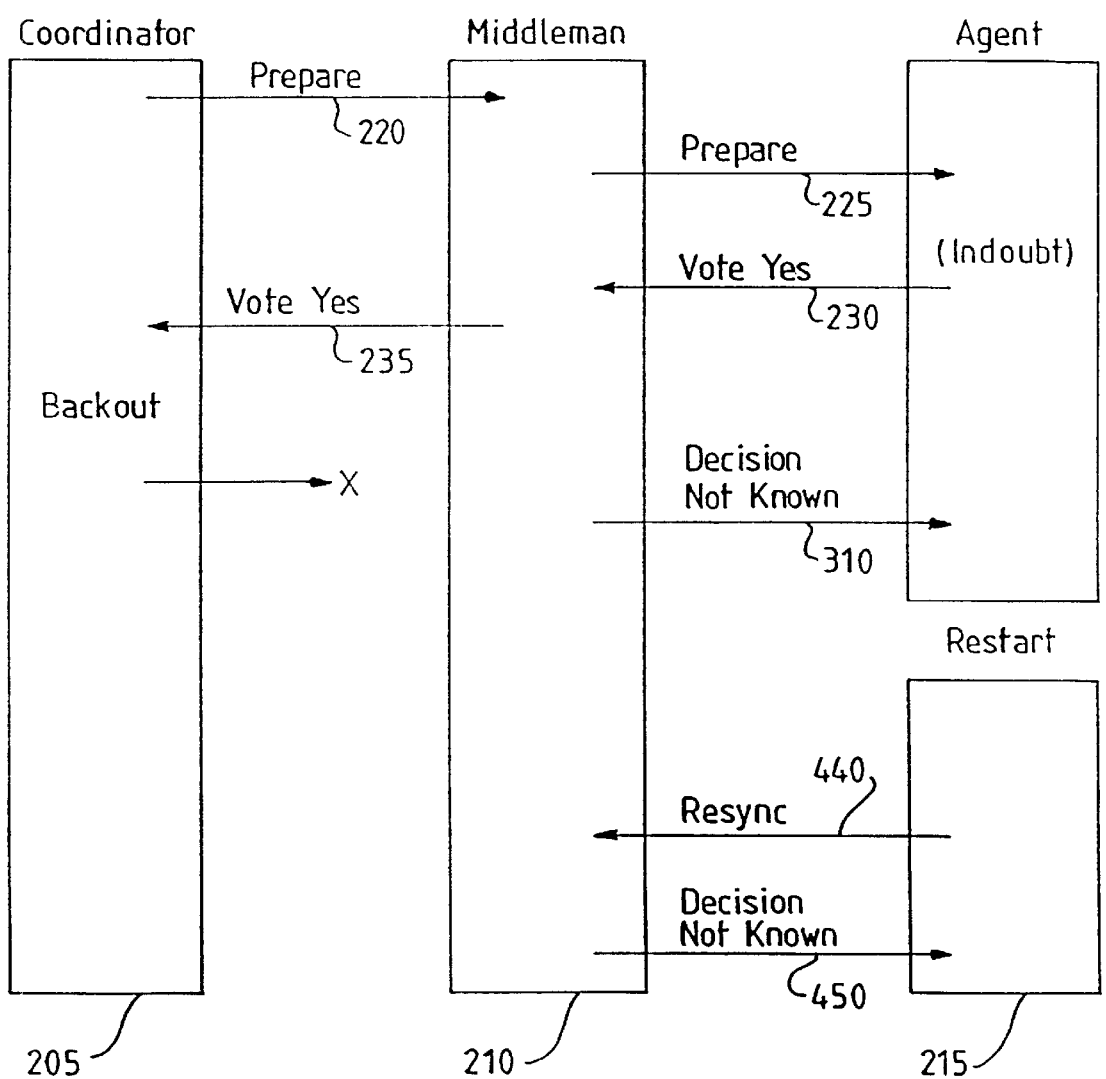

FIG. 4b shows a second message communication flow following a different restart of the same system. In the depicted example, the agent 215 has failed after receiving the Not Known decision message 310 from the middleman 210. Since the agent 215 does not force checkpoint information related to the Not Known decision messages to non-volatile storage, a failure of the agent 215 also causes volatile information about the protocol to be lost. In this case, knowledge of receipt of the Not Known decision message 310 is lost. This information is recovered following the restart of the agent 215 by attempting resynchronization with the middleman 210. A resynchronization message 440 is then sent by the agent 215 to the middleman 210. If the decision is still unknown at the middleman 210 a new Not Known decision message 450 will be sent to agent 215. This reestablishes the situation which existed before the failure.

Referring now to a general case, one or both of the two communicating nodes may have responsibility for initiating resynchronization following a failure. Which of them is responsible depends on the protocol agreed between the two nodes, the position which was reached before the system failed, and the decision made by the coordinator, which may relieve one of the partners of its responsibility. The present invention is workable in the Presumed Abort or Presumed Nothing and Last Agent Optimisation protocols defined by SNA for LU type 6.2. However, those skilled in the art will appreciate that it can be used in different protocol for two-phase commit.

Figure 5:
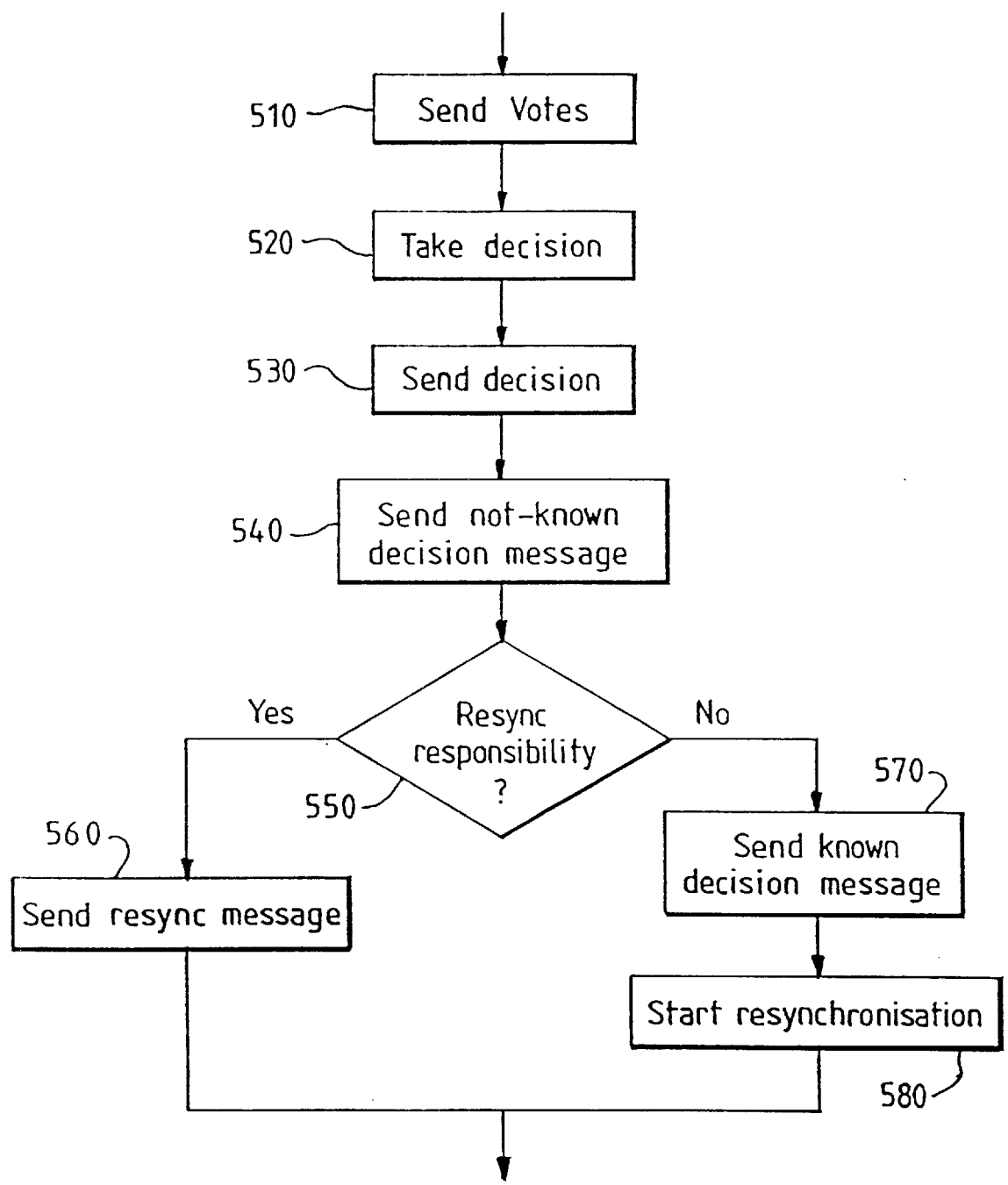
FIG. 5 is a schematic flow chart illustrating the rules of the protocol according to a particular embodiment of the present invention.

A schematic flow chart illustrating the rules of the protocol according to a particular embodiment of the present invention is shown in FIG. 5. Referring to block 510, all involved agents in the system are requested to prepare to commit. In response, the agents individually decide, based upon local conditions, whether to commit or back out their operations. The decisions are then communicated to the coordinator, that is each of the agents sends a vote indicating its availability (Vote Yes) or its non-availability (Vote No) to commit the unit of work.

At block 520, a decision is taken by the coordinator, based on the votes received from the agents. If all agents vote to commit, a request to commit is issued. On the other hand, if any agent votes to back out its operation, all agents are instructed to back out their operations.

The final decision is then broadcast by the coordinator to all the involved agents at block 530.

Referring now to block 540, the rules of the proposed solution require that the response to a vote Yes message can be a Not Known decision message. This happens when communication with the coordinator is lost before the decision is available at the middleman.

When a Not Known decision message has been sent and the decision subsequently becomes available, the process passes to block 550.

If the middleman has responsibility for resynchronization in the existing protocol, the control flow goes to block 560, where a resynchronization message is sent to the partners.

If the middleman does not have responsibility for resynchronization, a Known decision message is sent to the partners at block 570.

On receipt of a Known decision message, an agent starts resynchronization by sending a resynchronization message, as shown at block 580.

If a node fails, losing volatile information, it must communicate the fact to its partners. It must also attempt resynchronization for outstanding units of work as for the existing protocols. On receipt of a restarting message, outstanding resynchronizations which were suppressed by the not known decision message are retried. The reply to a resynchronization message can be a Not Known decision, if the decision is not available yet. It should be noted that the present invention requires no changes in the existing protocols for hardening of information to non-volatile media; all information is held in volatile storage and refreshed if the systems are restarted. The present solution allows then a relatively simple implementation.

Figure 6:
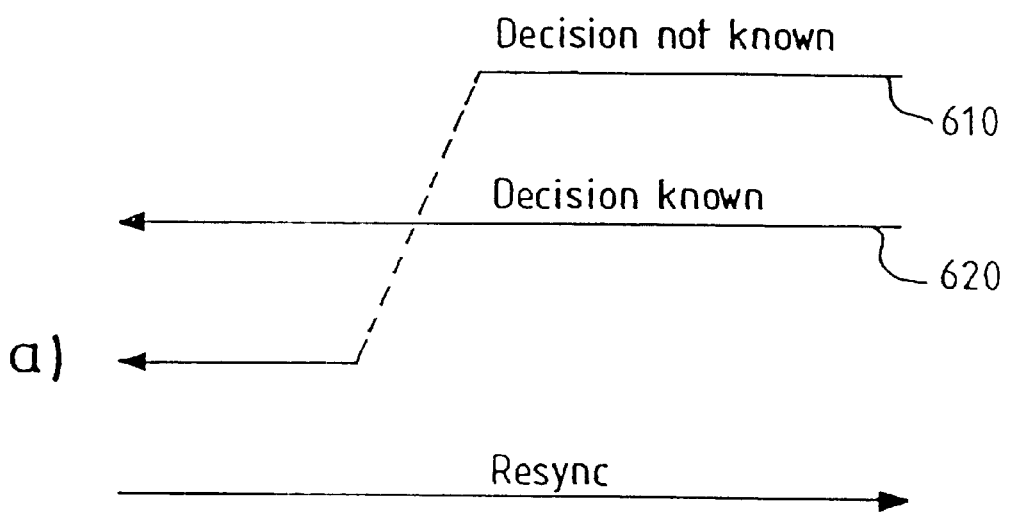
FIG. 6 depicts race conditions between messages.
Figure 6:
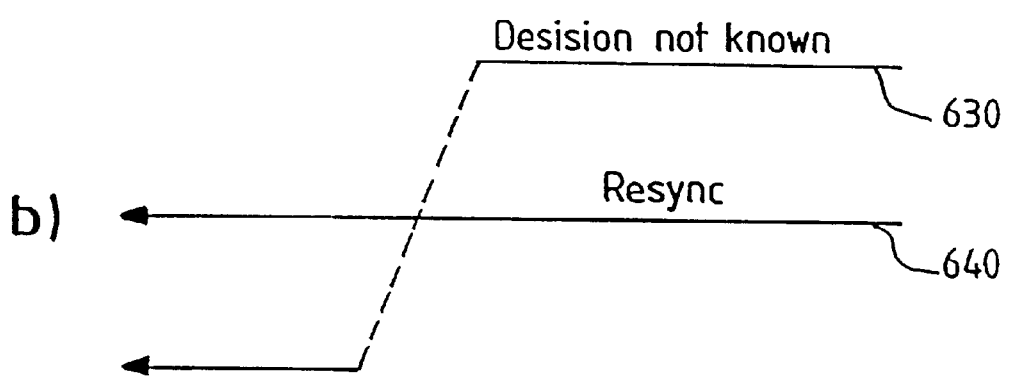

Referring to FIG. 6, race conditions between messages are depicted. In case (a), a race condition between a Not Known decision message 610 and a Known decision message 620 is shown. Clearly the latter cannot be sent before the former, but the messages can arrive at the receiver in an illogical order. A Not Known decision message 610 is sent, but is not received immediately. A Known decision message 620 is then sent. In the case (a) illustrated in FIG. 6, this Known decision message 620 propogates more quickly than the Not Known decision message 610, resulting in it being received before the Not Known decision message 610, which was sent earlier. After receipt of the Known decision message 620, the Not Known decision message 610 is then received. The receiver must be capable of ignoring the Not Known decision message 610 if it appears out of sequence. A similar condition is shown in case (b) between a Not Known decision message 630 and a resynchronization message 640. The former message is ignored if it arrives second.

It should be noted that, in the protocols known in the art, the processing of resynchronization may cause the breakage of communications sessions. The passive partner in the breakage must re-attempt the processing if it has responsibility and prevention of a tight retry loop demands a wait period before the breakage is initiated. This period is controlled by the middleman and is of somewhat arbitrary length, typically a compromise between the frequency of the retry and the timeliness of the eventual resynchronization. The possibility of this blocking of processing means that resynchronization tasks must be executable in parallel. At the restart of a node there may be many such tasks, which can overload it. If many communicating nodes are restarted simultaneously, deadlock can occur. The present invention guarantees that no blocking can occur in resynchronization. A single thread of execution can process resynchronization sequentially.

What is claimed is:

1. In a data processing system including a plurality of agents for participating in a transaction and a coordinator for coordinating said transaction, said agents including at least one middleman coordinating a subset plurality of said agents, a method for providing synchronization of said transaction including the steps of:

sending a vote indicating the availability or non-availability to commit from each of said agents in said subset to said middleman, said middleman determining a collective commit or backout decision for said subset;

sending a vote indicating the availability or non-availability to commit from said middleman and from said agents outside said subset to said coordinator;

determining an overall commit or backout decision by said coordinator when all said votes are received;

communicating said overall decision from said coordinator to said middleman and said agents outside said subset and from said middleman to said agents in said subset;

in response to loss of contact between said coordinator and said middleman, sending resynchronization initiating messages between said middleman and said coordinator and between agents in said subset and said middleman to cause said coordinator and said plurality of agents to attempt to resynchronize to a consistent state;

inhibiting the sending of resynchronization initiating messages from said subset of agents to said middleman, if said decision is not available at said middleman because of said loss of contact; and enabling the sending of resynchronization initiating messages from said subset of agents to said middleman upon availability of said overall decision at said middleman.

2. A method according to claim 1 in which said inhibiting step comprises sending a Not Known decision message from said middleman to each of the agents in said subset.

3. A method according to claim 2 in which said enabling step comprises sending a Known decision message to each of the agents in said subset, said Known decision message causing at least one of said agents in said subset to send a resynchronization initiating message to said middleman.

4. A method according to claim 3, further including the step of:
ignoring any Not Known decision message received by one of said subset of agents after receiving a Known decision message.

5. A method according to claim 2, further including the step of:
ignoring any Not Known decision message received by one of said subset of agents after receiving a resynchronization initiating message.

6. A method according to claim 2, wherein information related to said Not Known decision messages is stored only in a volatile memory in each of said subset of agents.

7. A method according to claim 2, further including the steps of:
sending a Restarted message to each of said subset of agents from said middleman after restart from a failure of said middleman;
sending a further resynchronization initiating message from each of said subset of agents to said middleman; and
sending a further Not Known decision message from said middleman to each of said subset of agents if said overall decision is not available yet at said middleman.

8. A distributed data processing system in which a transaction is synchronized, the system comprising:
a plurality of agents participating in said transaction, said agents including at least a middleman for coordinating a subset plurality of said agents;
a coordinator for coordinating said transaction;
means for sending a vote indicating the availability or non availability to commit from each of said agents in said subset to said middleman;
means in said middleman for determining a collective commit or backout decision for said subset;
means for sending a vote indicating the availability or non availability to commit from said middleman and from said agents outside said subset to said coordinator;
means for determining an overall commit or backout decision by said coordinator when all said votes are received;
means for communicating said overall decision from said coordinator to said middleman and said agents outside said subset and from said middleman to said agents in said subset;
means responsive to loss of contact between said coordinator and said middleman for sending resynchronization initiating messages between said middleman and said coordinator and between agents in said subset and said middleman to cause said coordinator and said plurality of agents to attempt to resynchronize to a consistent state;
means for inhibiting the sending of resynchronization initiating messages from said subset of agents to said middleman if said decision is not available at said middleman because of said loss of contact; and
means for enabling the sending of resynchronization initiating messages from said subset of agents to said middleman upon availability of said overall decision at said middleman.

9. A system according to claim 8 in which said means for inhibiting is operative to send a Not Known decision message from said middleman to each of the agents in said subset, receipt of said Not Known decision message inhibiting said resynchronization initiating messages.

10. A system according to claim 9 in which said means for enabling is operative to send Known decision message to each of the agents in said subset, at least one of said agents in said subset being responsive to said Known decision message to send a resynchronization initiating message to said middleman.

11. A system according to claim 10, further including:
means for ignoring any Not Known decision message received by one of said available subset of agents after receiving a Known decision message.

12. A system according to claim 9, further including:
means for ignoring any Not Known decision message received by one of said subset of agents after receiving a resynchronization initiating message.

13. A system according to claim 9 including, a volatile memory in each of said subset of agents wherein information related to said Not Known decision messages is stored.

14. A system according to claim 9, further including:
means for sending a Restarted message to each of said subset of agents from said middleman after restart from a failure of said middleman;
means for sending a further resynchronization initiating message from each of said subset of agents to said middleman; and
means for sending a further Not Known decision message from said middleman to each of said subset of agents if said overall decision is not available yet at said middleman.

15. A computer program embodied on a computer-readable medium for synchronizing a transaction in a distributed data processing system, the program comprising:
a plurality of agents participating in said transaction, said agents including at least a middleman for coordinating a subset plurality of said agents;
a coordinator for coordinating said transaction;
means for sending a vote indicating the availability or non availability to commit from each of said agents in said subset to said middleman;
means in said middleman for determining a collective commit or backout decision for said subset;
means for sending a vote indicating the availability or non availability to commit from said middleman and from said agents outside said subset to said coordinator;
means for determining an overall commit or backout decision by said coordinator when all said votes are received;
means for communicating said overall decision from said coordinator to said middleman and said agents outside said subset and from said middleman to said agents in said subset;
means responsive to loss of contact between said coordinator and said middleman for sending resynchronization initiating messages between said middleman and said coordinator and between agents in said subset and said middleman to cause said coordinator and said plurality of agents including said middleman to resynchronize to a consistent state;
means for inhibiting the sending of resynchronization initiating messages from said subset of agents to said middleman if said decision is not available at said middleman because of said loss of contact; and means for enabling the sending of resynchronization initiating messages from said subset of agents to said middleman upon availability of said overall decision at said middleman.

16. A computer program according to claim 15 in which said means for inhibiting is operative to send a Not Known decision message from said middleman to each of the agents in said subset, receipt of said Not Known decision message inhibiting said resynchronization initiating messages.

17. A computer program according to claim 16 in which said means for enabling is operative to send a Known decision message to each of the agents in said subset, at least one of said agents in said subset being responsive to said Known decision message to send a resynchronization initiating message to said middleman.

18. A computer program according to claim 17, further including:

means for ignoring any Not Known decision message received by one of said subset of agents after receiving a Known decision message.

19. A computer program according to claim 16, further including:

means for ignoring any Not Known decision message received by one of said subset of agents after receiving a resynchronization initiating message.

20. A computer program according to claim 16, further including:

means for sending a Restarted message to each of said subset of agents from said middleman after restart from a failure of said middleman;

means for sending a further resynchronization initiating message from each of said subset of agents to said middleman; and means for sending a further Not Known decision message from said middleman to each of said subset of agents if said overall decision is not available yet at said middleman.

* * * * *